(No Model.)

G. C. BOURDEREAUX.
TROLLEY FOR ELECTRIC CARS.

No. 524,017. Patented Aug. 7, 1894.

Witnesses
Arthur Keithley
C. Johnson

Inventor
George C. Bourdereaux
By L. M. Hurlow
Atty

UNITED STATES PATENT OFFICE.

GEORGE C. BOURDEREAUX, OF PEORIA, ILLINOIS.

TROLLEY FOR ELECTRIC CARS.

SPECIFICATION forming part of Letters Patent No. 524,017, dated August 7, 1894.

Application filed March 12, 1894. Serial No. 503,240. (No model.)

*To all whom it may concern:*

Be it known that I, GEORGE C. BOURDEREAUX, a citizen of the United States, residing at Peoria, in the county of Peoria and State of Illinois, have invented a certain new and useful Improvement in Trolleys for Electric Cars; and I do hereby declare the following to be a full, clear, and exact description of the invention, such as will enable others skilled in the art to which it appertains to make and use the same.

This invention relates to improvements in trolley wheels for electric cars.

The object of the invention is to provide a self lubricating trolley and to provide a trolley which, by its peculiar construction will outwear any trolley now used.

Figure 1:
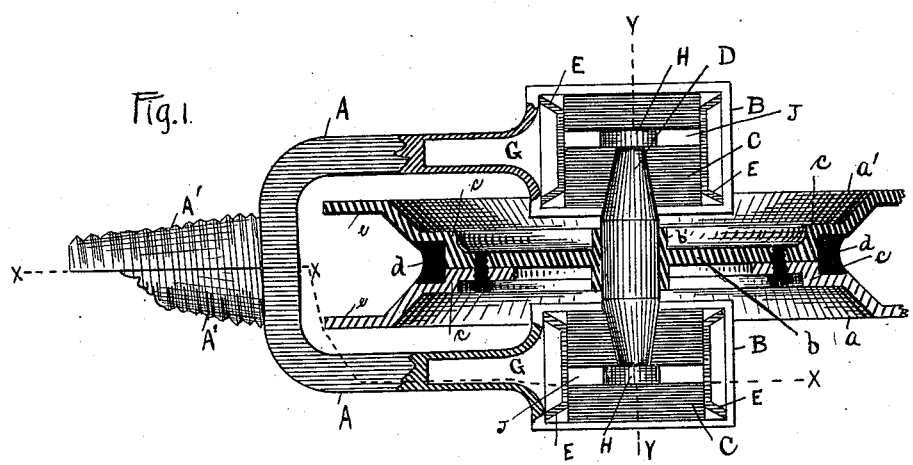
Figure 2:
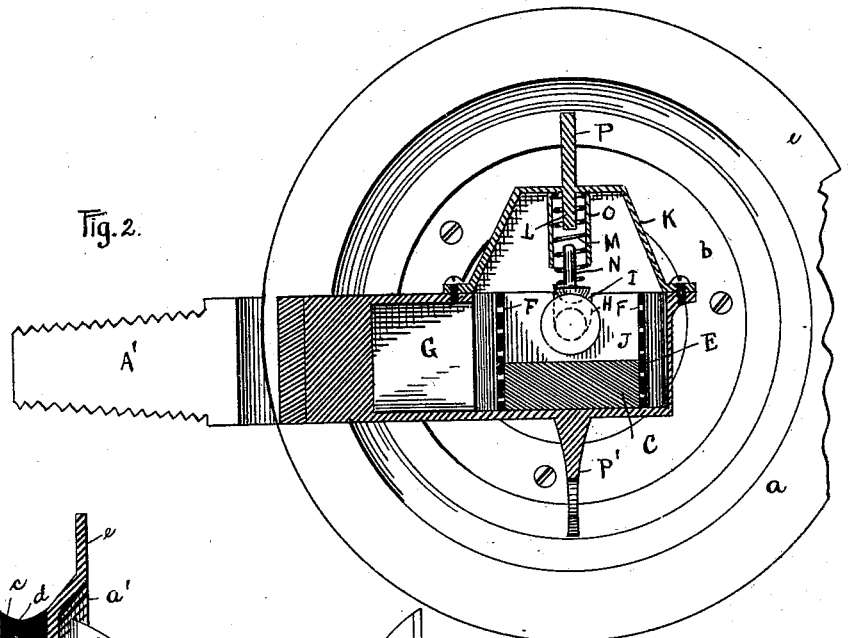
Figure 3:
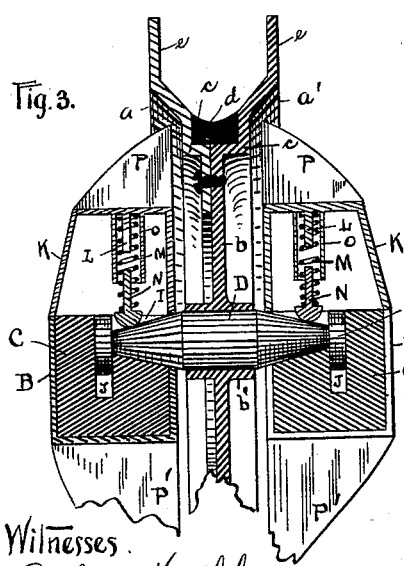
Figure 4:
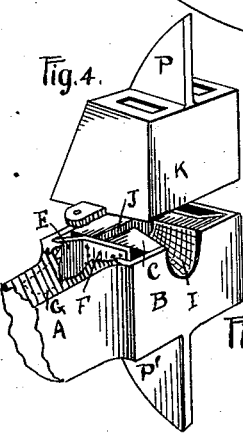
Figures 5, 6:
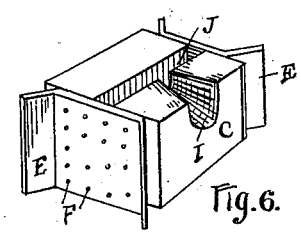

In the drawings presented herewith, Figure 1 represents a plan view of the trolley showing the wheel and bearing portions in section. Fig. 2 is a sectional side elevation of the trolley through line X X Fig. 1. Fig. 3 is a sectional end elevation of the trolley through line Y Y Fig. 1. Fig. 4 is a perspective view of a cap on the end of the trolley wheel fork. Fig. 5 is a perspective view of a portion of the trolley fork showing part in section. Fig. 6 is a perspective view of a slotted bearing block used in the fork and showing a perforated angle plate at either end thereof.

The fork of the trolley is made preferably in two halves A A as shown in the several figures. The rear ends of these arms A A are each provided with a tapering threaded portion A' which when brought together, in forming the fork, forms a tapering plug to enter the end of the trolley arm. The forward ends of the arms A A are enlarged into the hollow rectangular heads B B adapted to receive a wooden block C which forms the bearing for the shaft D. This block C is made somewhat shorter than the interior length of the head B, and an angle plate E having the perforations F is let down between the end of said block and the end walls of the heads as shown. This forms a receptacle at either end of the bearing block, for any form of lubricant. The portions of the arms adjacent to the heads B are hollowed out to form the recesses G G which communicate with the hollow head B through suitable openings or by the removal of a portion of the adjoining end wall of said head. This forms a much larger oil receptacle and at the same time lightens the device. The recesses may be closed in any desired manner.

The shaft D is made from a length of steel of the same diameter throughout and is thrust midway through the trolley wheel and there secured, and the portions on either side of the wheel are tapered toward the ends leaving the heads H.

The blocks C preferably of wood, are formed and slotted as shown; a tapering indentation I forms the seat for the taper of the shaft, and a slot J is cut in the block at right angles to the shaft and the head H hangs over into this said slot J to prevent end shake of the said shaft.

A cap K is provided to cover the head B and the under side of the top of the cap is provided with a lug $l$ over which is placed an opening coil spring M and a button N with a stem is soldered or otherwise attached to the free end of said spring and bears upon the tapering shaft within the indentation I, and a tube O attached to the cap incloses the spring M to retain it in proper position.

With the top of the cap K is formed a lug P having a curved edge, and with the bottom of the head B is also formed a similar lug P'. The use of these lugs will be hereinafter described.

An important point in the trolley is the wheel which is made in two parts $a$ and $a'$. The part $a'$ is formed as shown in cross section and having the central web B with which the hub $b'$ is formed, and the half $a$ is simply a ring which is secured to the web by bolts or other suitable means. The two parts of this wheel are so constructed as to leave a deep groove formed by the shoulders $c$ $c$ within which is held a ring $d$ of steel or iron. This ring outwears any wheel now used and when it is worn out may be easily replaced. Another point in the construction of the wheel is the form of the flanges $e$ $e$ which are straight, and parallel with the plane of the wheel instead of being rounded or curved as in ordinary trolley wheels. This construction prevents the wheel from jumping the wire as is the result with all trolleys.

The heads B with the caps K, and lugs P and the lugs P' are set inside of the outer side face of the wheel so that when the trolley strikes the overhead conducting wire, the curved lugs throw it off so that it does not catch on the wire until the wheel engages therewith. When the parts are assembled as shown in the several figures and the oil receptacles are provided with the proper lubricant, the device is in condition to do work. The bearing blocks being preferably of wood, of the harder sort, absorbs oil from the receptacles and thus keeps the bearings well lubricated and the oil also reaches the bearings by capillary attraction.

The coil spring M keeps a constant pressure upon the end of the shaft D keeping it in its bearing. By this construction the trolley is very long lived and consequently cheap and effective. The circuit to the car passes through the wheel, shaft, button N and spring M to the fork and thence through the trolley arm to the car.

What I claim as new, and desire to secure by Letters Patent, is—

1. In a trolley for electric cars, a fork constructed of two separable parts A A having the enlarged hollow heads B B, bearing blocks C C, retained within said heads, a shaft D having tapering ends with the heads H H let into the said blocks C C, a trolley wheel mounted upon the shaft D, said wheel composed of two separable halves $a$ $a$ inclosing a ring $d$ substantially in the manner and for the purposes herein set forth and described, 2. In a trolley for electric cars, a fork constructed of two separable halves A A having enlarged hollow extremities B a recess G formed in either arm of said fork adjacent to the said hollow heads or extremities for the purposes set forth, a bearing block C let into each of the extremities B, an angle plate E occupying a position between either end of the blocks C and the ends of said hollow extremities for the purposes set forth.

3. In a trolley for electric cars, a fork constructed of two separable halves A A having the enlarged hollow heads B B, bearing blocks C C occupying a position within the said heads, a shaft D seated in the bearing blocks, substantially as set forth, a cap K covering the bearings and provided with the depending lug L and the tube O containing the spring M, a button N bearing upon the shaft D and attached to the free end of said spring M substantially in the manner and for the purposes herein set forth and described.

4. In a trolley for electric cars, a fork constructed of two separable halves, having their free ends enlarged into the hollow heads B B, a bearing block C retained in each of the said hollow heads and provided with a tapering depression I for the reception of a shaft D, and a slot J made at right angles to said depression I substantially in the manner and for the purposes set forth and described.

In testimony whereof I affix my signature in presence of two witnesses.

GEORGE C. BOURDEREAUX.

Witnesses:
C. JOHNSON,
ARTHUR KEITHLEY.